(12) United States Patent
Downing et al.

(10) Patent No.: US 10,793,400 B1
(45) Date of Patent: Oct. 6, 2020

(54) MECANUM WHEEL POLE GRAPPLE ASSEMBLY

(71) Applicant: Altec Industries, Inc., Birmingham, AL (US)

(72) Inventors: James A. Downing, Salem, VA (US); Joshua J. Hickman, Troutville, VA (US); McNeil Andrew Garton, Roanoke, VA (US)

(73) Assignee: Altec Industries, Inc., Birmingham, AL (US)

( * ) Notice: Subject to any disclaimer, the term of this patent is extended or adjusted under 35 U.S.C. 154(b) by 0 days.

(21) Appl. No.: 16/725,546

(22) Filed: Dec. 23, 2019

(51) Int. Cl.
*E02D 7/22* (2006.01)
*B66C 23/18* (2006.01)
*F16L 3/202* (2006.01)
*B66C 13/08* (2006.01)

(52) U.S. Cl.
CPC .............. *B66C 23/18* (2013.01); *B66C 13/08* (2013.01); *E02D 7/22* (2013.01); *F16L 3/202* (2013.01)

(58) Field of Classification Search
CPC ........... B66C 1/427; B66C 1/68; B66C 13/08; B66C 1/585; B66C 23/18; A01G 23/095; E04H 12/347; E04H 17/263
See application file for complete search history.

(56) References Cited

U.S. PATENT DOCUMENTS

| | | | | |
|---|---|---|---|---|
| 1,877,974 A * | 9/1932 | Robb | ...................... | F16L 1/038 414/745.6 |
| 3,112,830 A * | 12/1963 | Podlesak | ................. | B66C 13/18 414/23 |
| 3,542,099 A * | 11/1970 | Gibson | ................ | A01G 23/091 144/4.1 |
| 4,212,577 A * | 7/1980 | Swanson | .................. | B66C 1/427 294/201 |
| 4,280,785 A * | 7/1981 | Albrecht | ................. | B66C 13/08 294/103.1 |
| 4,974,648 A * | 12/1990 | Propst | .................. | A01G 23/095 144/24.13 |
| 4,981,209 A * | 1/1991 | Sogge | .................... | B65G 13/10 193/35 MD |
| 5,058,638 A * | 10/1991 | Hacker | ................. | A01G 23/097 144/24.13 |
| 6,263,931 B1 * | 7/2001 | Ericksson | ............ | A01G 23/095 144/208.1 |
| 6,405,770 B1 * | 6/2002 | Camirand | ............ | A01G 23/097 144/24.13 |
| 8,162,583 B2 * | 4/2012 | Spilker | ................. | E04H 17/263 414/23 |
| 8,272,824 B1 * | 9/2012 | Putney | ...................... | B66F 9/18 414/23 |

(Continued)

FOREIGN PATENT DOCUMENTS

KR 101211878 B1 * 12/2012 ............. B60B 19/12

*Primary Examiner* — Gregory W Adams
(74) *Attorney, Agent, or Firm* — Erise IP, P.A.

(57) ABSTRACT

Embodiments of the invention provide a system and method of using a grapple assembly comprising grapple arms, mecanum wheels, and drive motors. The grapple assembly may use the grapple arms to grasp a pole and support the pole using the mecanum wheels. The drive motors may be configured to drive the mecanum wheels to rotate the mecanum wheels to provide translation and rotation of the pole. The method may be used for positioning and setting a pole, such as a utility pole.

20 Claims, 8 Drawing Sheets

(56) References Cited

U.S. PATENT DOCUMENTS

| | | | |
|---|---|---|---|
| 8,490,519 B2* | 7/2013 | Lavalley | E02F 3/965 |
| | | | 81/57.16 |
| 8,851,211 B2* | 10/2014 | Schlee | B25J 5/007 |
| | | | 180/14.1 |
| 8,992,159 B2* | 3/2015 | Sintek | B66C 1/427 |
| | | | 414/741 |
| 9,267,307 B2* | 2/2016 | St-Yves | B25J 15/024 |
| 2018/0080905 A1* | 3/2018 | Al Nahwi | B63C 11/42 |
| 2018/0112802 A1* | 4/2018 | Guerra | E21B 7/28 |
| 2018/0354654 A1* | 12/2018 | DesJardien | B64F 5/10 |

\* cited by examiner

MECANUM WHEEL POLE GRAPPLE ASSEMBLY

BACKGROUND

1. Field

Embodiments of the invention relate to pole grapple devices. More specifically, embodiments of the invention relate to pole grapple devices for rotating and translating poles.

2. Related Art

Known pole grapple devices are typically limited to grabbing tasks. In some cases, the pole grapple device may be secured to a distal end of a boom. The boom may be used to position the grapple device but may be limited in the ranges of motion. Existing grapple devices for forestry applications may include wheels for translating a tree, but do not allow for rotation thereof.

Known grapple devices are not capable of rotating a pole, which may be helpful in proper positioning of the pole. For example, in power applications, a utility pole may need to be positioned and rotated in a specific orientation before being placed into a hole in the ground. Because the current grapple devices are not capable of mechanically rotating the pole, the operators may have to manually rotate the pole before the pole is grabbed by the grapple device. Typically, the grapple device may have to release the pole so the pole can be rotated, then regrasp the pole. Thus, considering the complex motions necessary to position a pole, there is a need for a grapple device that translates and rotates the pole.

SUMMARY

Embodiments of the invention solve the above-mentioned problems by providing a grapple assembly that utilizes a plurality of mecanum wheels to grasp a pole, translate the pole, and rotate the pole. In some embodiments, the system may be used for setting utility poles in a hole. The utility pole may be rotated to position components of the utility pole in a designated orientation and the utility pole may be translated to lower the utility pole into the hole.

A first embodiment of the invention is directed to a grapple assembly for grasping and positioning a pole, the grapple assembly comprising a grapple base, a plurality of grapple arms pivotably attached to the grapple base configured to grasp the pole therebetween, a plurality of mecanum wheels, wherein the plurality of mecanum wheels are disposed on the plurality of grapple arms or on the grapple base, and a plurality of drive motors, wherein each drive motor is coupled to one of the plurality of mecanum wheels, wherein each drive motor is configured to drive the respective mecanum wheel to translate and rotate the pole.

A second embodiment of the invention is directed to a method for using a grapple assembly to position a pole, the method comprising the steps of providing a grapple assembly comprising a grapple base, a plurality of grapple arms pivotably attached to the grapple base, a plurality of mecanum wheels, wherein the plurality of mecanum wheels is disposed on the plurality of grapple arms or on the grapple base, a plurality of drive motors, wherein each drive motor is coupled to one of the plurality of mecanum wheels, moving at least one grapple arm of the plurality of grapple arms to grasp the pole between the plurality of grapple arms, applying a force through the plurality of mecanum wheels to hold the pole, driving at least one of the plurality of drive motors to rotate at least one of the plurality of mecanum wheels to translate the pole, and moving at least one grapple arm of the plurality of grapple arms to release the pole.

A third embodiment of the invention is directed to a system for setting a pole, the system comprising a grapple assembly adapted to be secured to a distal end of a boom, the grapple assembly comprising a grapple base, and an upper grapple configured to grasp the pole therebetween comprising a first upper grapple arm pivotably attached to the grapple base, a first upper mecanum wheel disposed on the first upper grapple arm, a first upper drive motor coupled to the first upper mecanum wheel, a second upper grapple arm pivotably attached to the grapple base, a second upper mecanum wheel disposed on the second upper grapple arm, and a second upper drive motor coupled to the second upper mecanum wheel, wherein each of the first upper drive motor and the second upper drive motor are configured to drive the first upper mecanum wheel and the second upper mecanum wheel respectively to translate and rotate the pole.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE FIGURES

Embodiments of the invention are described in detail below with reference to the attached figures, wherein.

Figure 1:
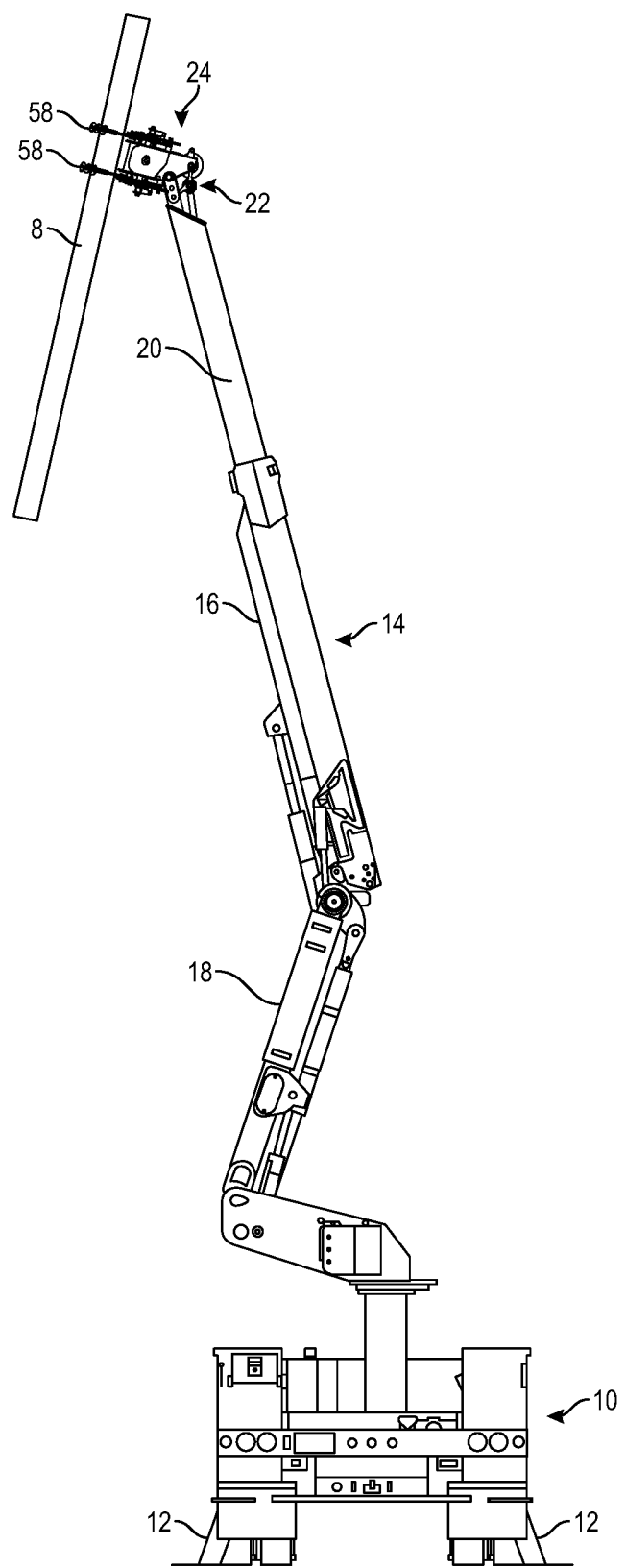
FIG. 1 depicts an embodiment of a utility truck having a boom assembly that is secured to a grapple assembly.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

FIG. 1 shows a utility vehicle 10 comprising a boom assembly 14 attached to a grapple assembly 24 for some embodiments. In some embodiments, the utility vehicle 10 may comprise a plurality of outriggers 12. In some embodiments, the boom assembly 14 may be attached to the utility vehicle 10 at a bed of the utility vehicle 10. The boom assembly 14 may comprise a boom 16 having a proximal end 18 and a distal end 20. The grapple assembly 24 may be attached to the boom 16 at the distal end 20 of the boom 16 by securing the distal end 20 of the boom 16 to a grapple base 28 of the grapple assembly 24. The grapple assembly 24 may be attached to the boom 16 via attachment assembly 22. The grapple assembly 24 may be equipped with a plurality of mecanum wheels 58 which may be seen in more detail in FIGS. 2A and 2B.

Operation of the utility vehicle 10 with the boom assembly 14 and the grapple assembly 24 of FIG. 1 will now be described. During operation, the utility vehicle 10 may be driven to a location. The orientation and extension of the boom 16 of the boom assembly 14 may be adjusted according to operator input, to position the grapple assembly 24 near a pole 8. In some embodiments, the pole 8 may be a utility pole. In some embodiments, the pole 8 may be stored in a pole rack. The pole rack may be attached to the utility vehicle 10 on a bed of the utility vehicle 10. The grapple assembly 24 may be oriented so that an inner surface of the grapple assembly 24 faces the pole 8. The plurality of mecanum wheels 58 on the grapple assembly 24 may contact the pole 8 to support the pole 8. While holding the pole 8, the mecanum wheels 58 may be driven to rotate or translate the pole 8.

Figure 2A:
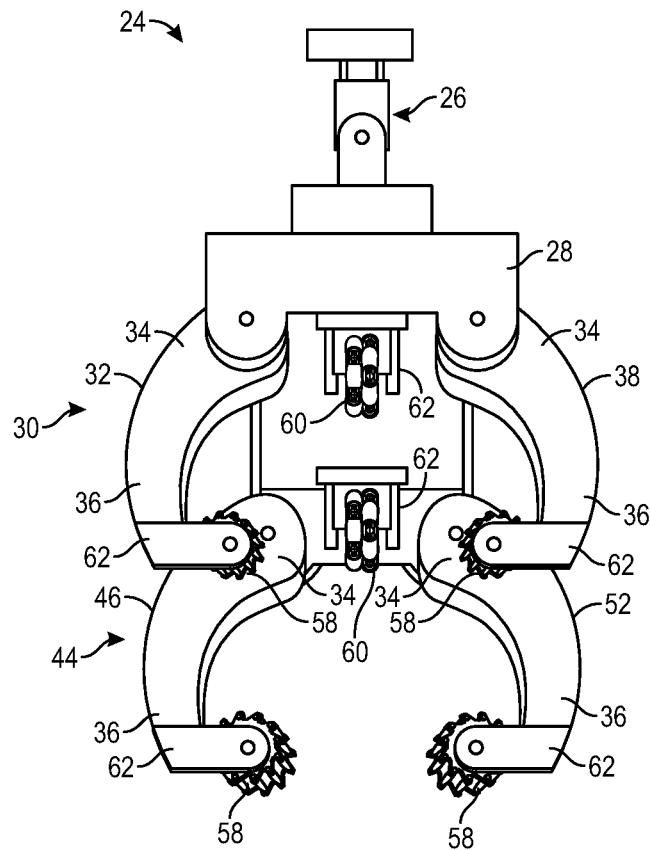
FIG. 2A depicts a first embodiment of a grapple assembly.

FIG. 2A depicts a grapple assembly 24 comprising a grapple base 28, an upper grapple 30, a lower grapple 44. The upper grapple 30 comprises a first upper grapple arm 32 and a second upper grapple arm 38. The lower grapple 44 comprises a first lower grapple arm 46 and a second lower grapple arm 52. The first upper grapple arm 32 may be pivotably attached to the grapple base 28, which may be attached to the wrist joint 26 with at least one hinge. Each of the second upper grapple arm 38, first lower grapple arm 46, and second lower grapple arm 52 may also be pivotably attached to the grapple base 28. In some embodiments, the wrist joint 26 may include two hinge joints each allowing the grapple assembly 24 to rotate about a respective axis. In some embodiments, a first end of the wrist joint 26 may be secured to the grapple base 28 while a second end of the wrist joint 26 may be configured to attach to another device, such as, for example, boom 16, a crane (not shown), or a cable (not shown). At least one of the plurality of mecanum wheels 58 may be disposed on the first grapple arm 32. In some embodiments, one of the plurality of mecanum wheels 58 may be disposed at a grapple arm tip 36 of each of the first upper grapple arm 32, the second upper grapple arm 38, the first lower grapple arm 46, and the second lower grapple arm 52, as shown.

In some embodiments, at least one of the plurality of mecanum wheels 58 may be positioned in various other locations along the inner surface of one of the first upper grapple arm 32, the second upper grapple arm 38, the first lower grapple arm 46, and the second lower grapple arm 52, such as, for example, at the grapple arm base 34, or between the grapple arm tip 36 and grapple arm base 34. In some embodiments, it may be desirable to place one of the mecanum wheels 58 between the grapple arm tip 36 and grapple arm base 34 so that the grapple arm tip 36 extends past the one of the mecanum wheels 58 as a safety measure. Here, the grapple arm tip 36 may ensure that, in the case of a malfunction, the grapple arm tip 36 will provide structure to support the pole 8 of FIG. 1.

In some embodiments, an idler wheel 60 may be disposed adjacent to the grapple base 28, as shown in FIG. 2A. The idler wheel 60 may be one of an idler omni-wheel, as shown, or an idler spherical roller. In some embodiments, the idler wheel may be used to support the pole 8 along with the mecanum wheels 58. In embodiments where idler wheel 60 is an idler omni-wheel, the idler wheel 60 may be operable to rotate freely. Thus, the idler wheel 60 will not restrict the motion of the pole 8 held by the grapple assembly 24. Idler wheel 60 may be supported by support structure 62, as shown. In other embodiments, idler wheels 60 and mecanum wheels 58 may be located anywhere along the grapple base 28 or grapple arms. Alternative arrangements of mecanum wheels 58 and idler wheels 60 are possible.

Figure 2B:
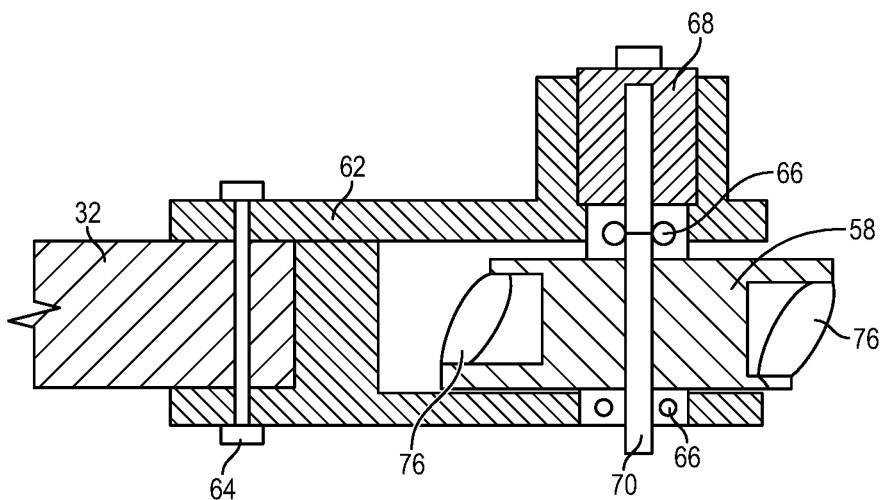
FIG. 2B depicts an embodiment of a grapple arm.

FIG. 2B depicts a cross-sectional view of the first upper grapple arm 32, support structure 62, one of the mecanum wheels 58, and drive motor 68 of some embodiments. The support structure 62 may be secured to the first upper grapple arm 32 using at least one fastener 64. The support structure 62 may comprise at least one bearing component 66. In some embodiments, the bearing component 66 may be secured to the input shaft 70. The drive motor 68 may be attached to the support structure 62 to hold the drive motor 68 in place relative to the first upper grapple arm 32. The input shaft 70 may be driven by the drive motor 68. One of the mecanum wheels 58 may be secured to the input shaft 70 so as to rotate with the input shaft 70. Thus, the drive motor 68 may be used to drive one of the mecanum wheels 58, via input shaft 70, which may be supported by bearing component 66. Any of the connections or attachments described herein may be accomplished using any type of fastener component such as, for example, a bolt, a weld, or a screw. Further, connections may be made using a press fit or any other means of connection. In some embodiments, the support structure 62 may include the bearing component 66 or be integral with the bearing component 66. Although FIG. 2B is described with respect to first upper grapple arm 32, similar arrangements apply to second upper grapple arm 38, first lower grapple arm 46, and second lower grapple arm 52.

Figure 7:
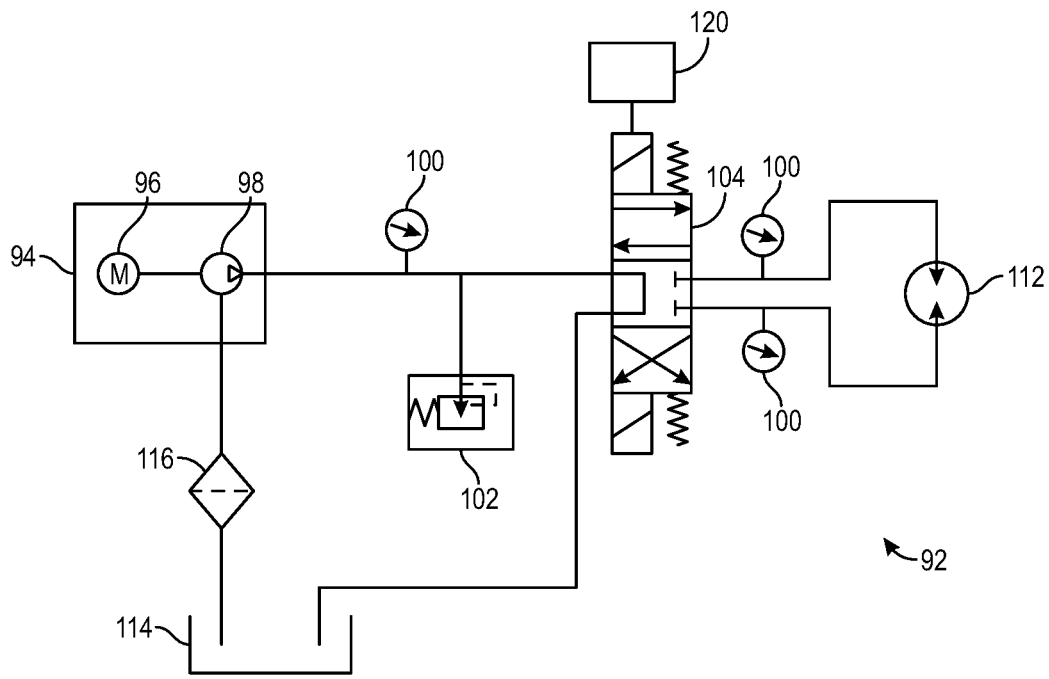
FIG. 7 depicts an embodiment of a hydraulic circuit.

Support structure 62 may be used to hold one of the mecanum wheels 58 in place while allowing independent rotation of the mecanum wheel. The support structure 62 may be secured to the grapple arm using at least one fastener 64. The fastener 64 may be any fastener component such as, for example, a bolt, a weld, or a screw. The support structure 62 may also be secured to drive motor 68 that may be positioned adjacent to one of the mecanum wheels 58 to drive said mecanum wheel. The drive motor 68 may be any type of motor, such as, for example, a hydraulic motor 112 (as shown in FIG. 7), an electric motor, and a pneumatic motor.

Figure 2C:
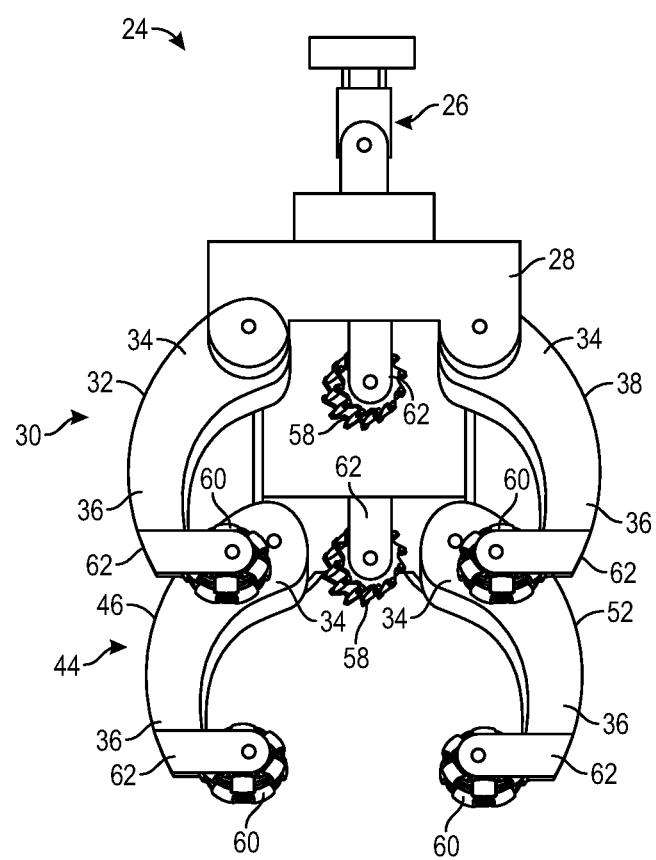
FIG. 2C depicts a second embodiment of a grapple assembly.

FIG. 2C shows a second embodiment of the grapple assembly 24. In some embodiments, various positions of the mecanum wheels 58 and idler wheels 60 are contemplated. For example, the mecanum wheels 58 may be secured to the grapple base 28 using the support structure 62, as shown. In some embodiments, each of the idler wheels 60 may be secured to one of the first upper grapple arm 32, second upper grapple arm 38, first lower grapple arm 46, and second lower grapple arm 52. The idler wheels 60 may be attached to each of the grapple arm tips 36 using the support structure 62, as shown. In some embodiments, it may be desirable to secure the mecanum wheels 58 to the grapple base 28. Here, the drive motors 68 may be positioned adjacent to each of the mecanum wheels 58 on the grapple base 28. In some embodiments, the grapple base 28 may protect the drive motors 68. It may also be desirable to place the mecanum wheels 58 and drive motors 68 on the grapple base 28 because the drive motors 68 may be attached to power lines that run to the grapple base 28. In some embodiments, the grapple base 28 may support the mecanum wheels 58 as they are driven by the drive motors 68.

Figure 6:
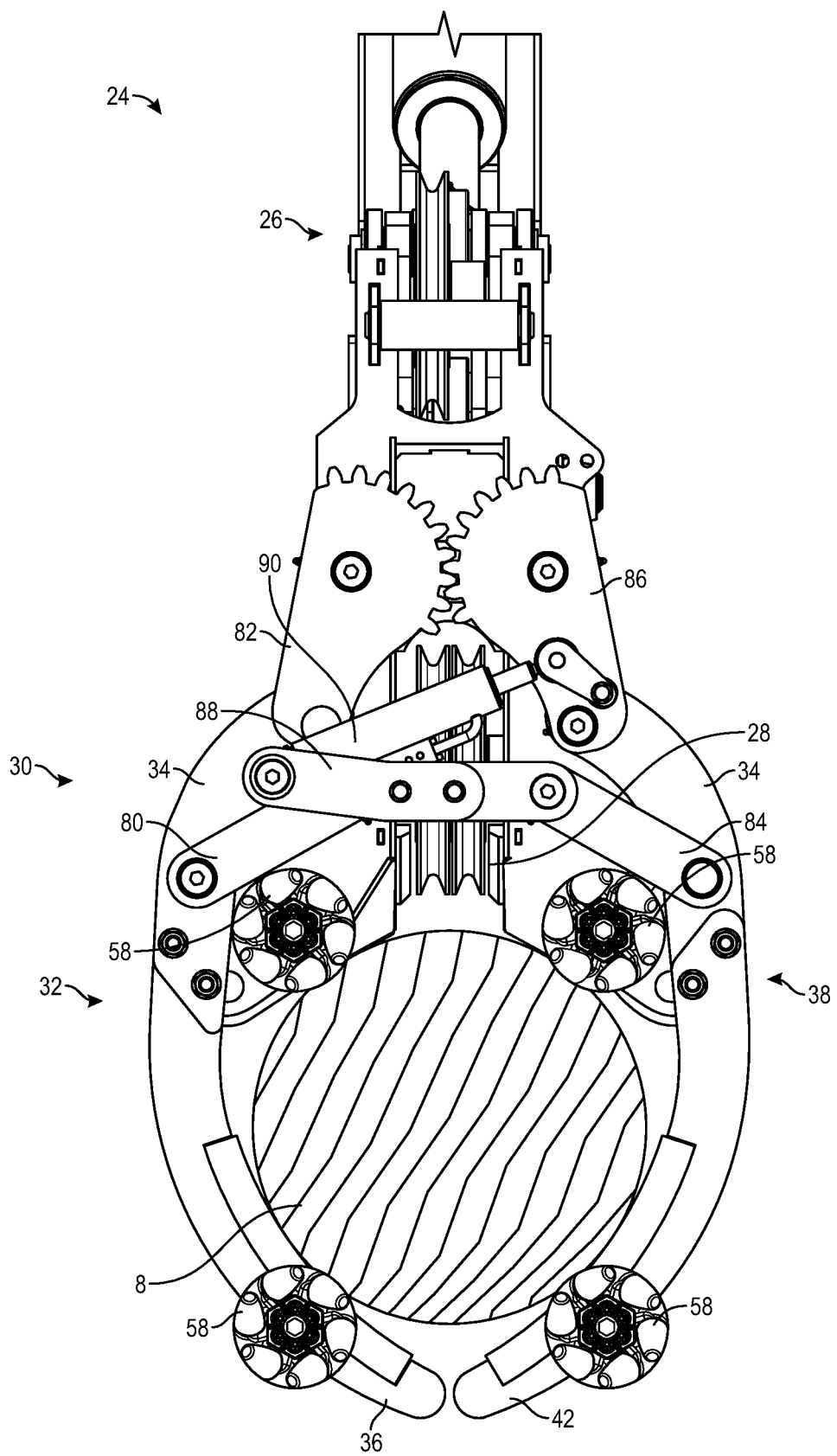
FIG. 6 depicts an embodiment of a grapple assembly with a first grapple arm and a second grapple arm.

In some embodiments, the mecanum wheels 58 may be positioned above or below the first upper grapple arm 32. Additionally, the support structure 62 may be attached to a surface of the first upper grapple arm 32 to extend outwardly from the first upper grapple arm 32. Thus, one of the mecanum wheels 58 may be positioned in the same plane as the first upper grapple arm 32 as shown in FIG. 2B. In some embodiments, it may be desirable to place mecanum wheels 58 on offset planes, such as one of the mecanum wheels 58 being located above the first upper grapple arm 32 and another one of the mecanum wheels 58 being located below the second upper grapple arm 38. As such, the first upper grapple arm 32 and the second upper grapple arm 38 of FIG. 2A may be permitted to overlap without interference of the first upper grapple arm 32 and second upper grapple arm 38 or the mecanum wheels 58. The first upper grapple arm 32 and second upper grapple arm 38 may overlap when in a closed position, which may be desirable to save space for storage or transportation of the grapple assembly 24. Alternatively, in some embodiments, it may be desirable to position the mecanum wheels 58 in the same plane to symmetrically grip and support the pole 8. Here, the upper grapple 30 may not be able to fully close as the first upper grapple arm 32 and second upper grapple arm 38 cannot overlap. In some such embodiments, it may be desirable to provide a control mechanism or physical lock to prevent the upper grapple 30 from closing past a certain threshold to prevent the mecanum wheels 58 from contacting each other and potentially becoming damaged. In embodiments that include a hydraulic cylinder 90 as shown in FIG. 6, the hydraulic cylinder 90 may be sized according to the desired maximum opening and closing parameters of the upper grapple 30.

In some embodiments, it may be desirable to control each of the upper grapple 30 and lower grapple 44 independently, especially for applications where the pole 8 may be a tapered pole. Accordingly, the upper grapple 30 may be designed to grasp a first diameter of the pole 8 that varies from a second diameter of the pole 8 grasped by the lower grapple 44. The first upper grapple arm 32, second upper grapple arm 38, the first lower grapple arm 46, and second lower grapple arm 52 may be driven by a hydraulic cylinder 90 as will be described below in reference to FIG. 6. The grapple arms 30 may have a retract function for grasping the pole 8 and an expand function for releasing the pole 8. In some embodiments, each of the upper grapple 30 and the lower grapple 44 may comprise an individual suspension for support. The individual suspensions may be desirable when the grapple assembly 24 is used to grasp a tapered pole. As such, each of the upper grapple 30 and lower grapple 44 may comprise a designated hydraulic cylinder 90 so that the upper grapple 30 and lower grapple 44 may be controlled independently. Independent control of the grapples 30, 44 may be desirable when grasping a pole 8 that is tapered with varying cross-sections between the position of the upper grapple 30 and lower grapple 44. Independent control of the upper grapple 30 and lower grapple 44 may also allow the grapple assembly 24 to grasp objects of a variety of shapes and sizes to fit a range of geometries.

In some embodiments, the grapple assembly 24 may comprise wrist joint 26 attached to the grapple base 28. The wrist joint 26 may be operable to rotate about a first axis and a second axis to position the grapple assembly 24. In some embodiments, the grapple assembly 24 may comprise at least one grapple, which may be upper grapple 30 or lower grapple 44. The at least one grapple may comprise at least two grapple arms, which may be first upper grapple arm 32 and second upper grapple arm 38. Each grapple arm having grapple arm base 34 and grapple arm tip 36. The grapple assembly 24 may further comprise at least two mecanum wheels 58. Each of the mecanum wheels 58 may be attached to the grapple assembly 24 via support structure 62. The support structure 62 may be secured to the grapple assembly 24 at various locations along the grapple assembly 24 and may comprise various types of fastener components. In some embodiments, the support structure 62 may include one or more fastener components, such as, for example, a bolt, a weld, and a screw. In some embodiments, the fasteners 64 may be used to secure the support structure 62 onto the first upper grapple arm 32 and additional fastener components may be used to secure the support structure 62 to a base of one of the mecanum wheels 58 so the one of the mecanum wheels is attached to the support structure 62 but may still rotate independently from the support structure 62. In some embodiments, one of the mecanum wheels 58 may be directly attached to the first upper grapple arm 32. In some embodiments, the mecanum wheels 58 may be secured to input shaft 70 and the input shaft 70 may be held in place by bearing component 66. The bearing component 66 may be secured to the support structure 62, so that the support structure 62 is used to support the bearing component 66, input shaft 70, and at least one of the mecanum wheels 58.

The grapple assembly 24 may further comprise a plurality of drive motors 68, which in some embodiments, may be hydraulic motors, such as hydraulic motor 112 as shown in FIG. 7. The number of drive motors may be equal to the number of mecanum wheels 58. Each drive motor 68 may be positioned adjacent to a respective mecanum wheel 58 to drive the respective mecanum wheel 58 in one of a first direction and a second direction. In some embodiments, the drive motor 68 may drive input shaft 70. Input shaft 70 may be coupled to the respective mecanum wheel 58 so that rotation of the drive motor 68 may be translated through the input shaft 70 to the respective mecanum wheel 58. In some embodiments, the input shaft 70 may be placed within the bearing component 66. The bearing component 66 may allow the input shaft 70 to rotate independently from the support structure 62 while still being supported by the support structure 62. The support structure 62 may be attached to an outer portion of the at least one bearing component 66. In some embodiments, the bearing component 66 may be attached to the first upper grapple arm 32 using fastener 64, which in some such embodiments, may be a press fit connection.

In some embodiments, the grapple assembly 24 may comprise upper grapple 30 and lower grapple 44. The upper grapple 30 may be attached to grapple base 28. The upper grapple 30 may comprise first upper grapple arm 32, and a second upper grapple arm 38, wherein each of the first upper grapple arm 32 and second upper grapple arm 38 comprise a respective grapple arm base 34 and a grapple arm tip 36. Each of the first upper grapple arm 32 and the second upper grapple arm 38 may be pivotably attached to the grapple base 28 at the respective grapple arm base 34. At least two mecanum wheels 58 may be attached to the grapple arms of the upper grapple 30.

The lower grapple 44 may be attached to the grapple base 28. The lower grapple 44 may comprise a first lower grapple arm 46, and a second lower grapple arm 52, wherein each of the first lower grapple arm 46 and second lower grapple arm 52 comprises a respective grapple arm base 34 and a grapple arm tip 36. Each of the first lower grapple arm 46 and the second lower grapple arm 52 may be pivotably attached to the grapple base 28 at the respective grapple arm base 34. At least two mecanum wheels 58 may be attached to the grapple arms of the lower grapple 44.

In some embodiments, one of the mecanum wheels 58 may be disposed adjacent to the grapple arm tip 36 and may be driven inwards by the drive motor 68 to draw in the pole 8, so that the pole 8 is positioned within the upper grapple 30 and lower grapple 44. Once the pole 8 is positioned in at least one of the upper grapple 30 and lower grapple 44, between at least the first upper grapple arm 32 and second upper grapple arm 38, the upper grapple 30 may be closed so that a force is applied from the mecanum wheels 58 to the pole 8 to hold the pole 8 in place. Once the pole 8 is grasped, the boom 16 may be lifted to raise the grapple assembly 24 with the pole 8 held therein. The force applied to the pole 8 may be varied according to the weight and shape of the pole 8 and the specific application of the grapple assembly 24.

Next, the pole 8 may be translated by driving the mecanum wheels 58 using the drive motor 68. Each of the mecanum wheels 58 may be driven in a particular direction according to the orientation of the respective one of the mecanum wheels 58 and the desired operation (i.e., translation, rotation). The translation of the pole 8 may be along the length of the pole 8. In certain cases, the pole 8 may be translated to center the grip of the grapple assembly 24 on the pole 8, for example, if the pole 8 is initially grasped on an end of the pole 8, the pole 8 may be translated so that the pole 8 is grasped near the center of gravity of the pole 8. Grasping the pole 8 near the center of gravity may aid in supporting the pole 8. In certain other cases, the pole 8 may be translated to move the pole 8 into a specific location. For example, the pole 8 may be held, by the grapple assembly 24, over a hole. The pole 8 may then be translated to lower the pole 8 into the hole to set the pole 8.

The pole 8 may then be rotated by driving the mecanum wheels 58 using the drive motor 68. Again, each of the mecanum wheels 58 may be driven in a particular direction independent of each other according to the orientation of the respective one of the mecanum wheels 58 and the desired operation (i.e., translation, rotation). The rotation of the pole 8 may be along an axis extending along the length of the pole 8. The axis may be the minor principal axis of the pole 8. In certain cases, the pole 8 may be rotated to orient the pole 8 in a designated orientation. For example, if the pole 8 is a utility pole, the pole 8 may be rotated so that at least one insulator of the pole 8 and a crossbar of the pole 8 are in a designated orientation, or the pole 8 may be rotated to aid in attaching components to the pole 8, such as the insulator or the crossbar. In some embodiments, the utility pole 8 may have at least one hole on the utility pole 8 for attaching an additional component to the utility pole 8. Accordingly, it may be desirable to rotate the utility pole 8 in order to orient the at least one hole in a designated orientation.

In some embodiments, it may be desirable to align a first cross arm of a utility pole 8 with a second cross arm of another utility pole 8. The cross arms of the utility poles 8 may be used to support cables which may be power lines, or telephone lines. Additionally, a different component of the utility pole 8 may be aligned with the other utility pole, such as, for example, an insulator of the utility pole.

After translation and rotation of the pole 8, the pole 8 may be released from the grapple assembly 24 by opening at least one of the upper grapple 30 and lower grapple 44. Opening the upper grapple 30 may relieve the force applied to the pole 8 by the mecanum wheels 58, thus freeing the pole 8 from the grapple assembly 24. In some embodiments, the pole 8 may be placed upright into a hole by the grapple assembly 24.

It should be understood that the pole 8 described herein may be any substantially cylindrical object, such as, for example, a utility pole, a log, a light pole, a flagpole, and a structural column. In some embodiments, the pole 8 may be a tapered pole having a first end with a smaller diameter than the diameter of a second end. Other non-cylindrical geometric shaped objects are also contemplated.

In some embodiments, the boom 16 may be equipped with a digger assembly (not shown) for digging a hole for placement of the pole 8. The digger assembly may be attached to the distal end 20 of the boom 16 adjacent to the grapple assembly 24. The digger assembly may be used to dig the hole before setting the pole 8. In some such embodiments, an auger of the digger assembly may be sized according to the size of the pole 8.

In some embodiments, the grapple assembly 24 may be incorporated into other devices, such as, for example, a crane, or a fixed structure. Other embodiments of the invention are contemplated, such as an embodiment where the invention includes a grapple assembly 24 for grappling a pole 8 and moving along the pole 8, wherein the pole 8 is not moved but the grapple assembly 24 may translate or rotate about the pole 8.

Figure 3A:
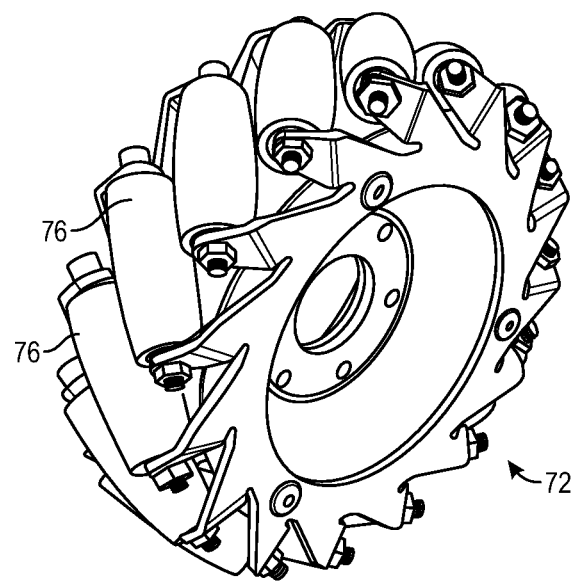
FIG. 3A depicts an embodiment of a left hand type mecanum wheel.
Figure 3B:
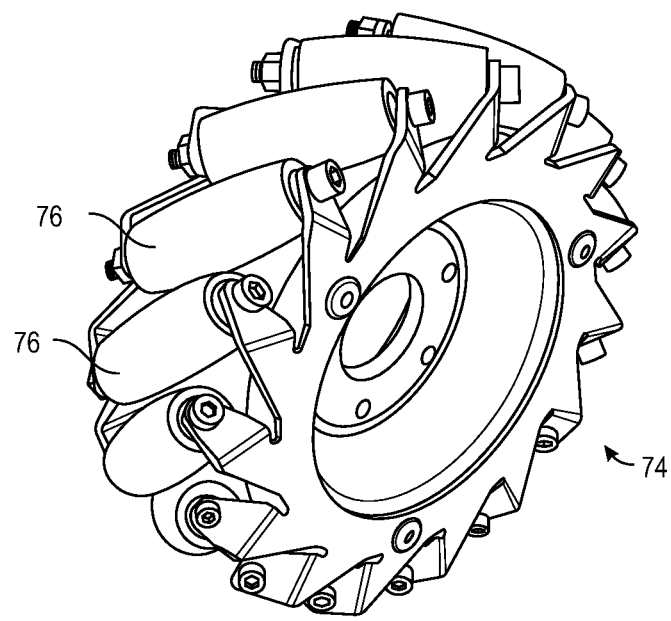
FIG. 3B depicts an embodiment of a right hand type mecanum wheel.

FIG. 3A depicts a left hand type mecanum wheel 72 and FIG. 3B depicts a right hand type mecanum wheel 74. Each of the mecanum wheels 58 in FIGS. 1, 2A, and 2B may be a left hand type mecanum wheel 72 or a right hand type mecanum wheel 74. Each of the plurality of mecanum wheels 58 may comprise rollers 76 secured along an outer surface of the respective mecanum wheel 58. The rollers 76 may be oriented at a 45 degree angle from the axis of rotation for the left hand type mecanum wheel 72 and the rollers 76 may be oriented at a negative 45 degree angle from the axis of rotation for the right hand type mecanum wheel 74. Although 45 degrees is the preferred embodiment, other orientation angles are contemplated.

When the rollers 76 are in contact with a surface, rotation of the respective mecanum wheel of the plurality of mecanum wheels 58 may transmit a force to the surface. The force may have a first force component parallel to the axis of rotation of the respective mecanum wheel 58 and a second force component in the direction of rotation of a point on the surface of the respective mecanum wheel 58. By reversing the direction of rotation of the mecanum wheels 58 the components of the force will be applied in an opposite direction.

In some embodiments, the rollers 76 may be made from a relatively durable material to withstand the contact force associated with grasping the pole 8. The material of the rollers 76 may also be selected to improve the durability of the rollers 76 for repeated operation. In some embodiments, the material and the geometry of the rollers 76 may be selected to increase the friction between the rollers 76 and the pole 8. For example, the rollers 76 may include a textured outer surface for gripping the pole 8 and reducing sliding between the outer surface of the rollers 76 and the pole 8. In some embodiments, the rollers 76 may be composed of a rubber material or hard plastic material, though any other suitable material may be used. In some embodiments, the material of the rollers 76 may be selected to improve the structural integrity of the rollers 76. Accordingly, in some embodiments, the rollers 76 may be composed of a metal material.

Figure 4A:
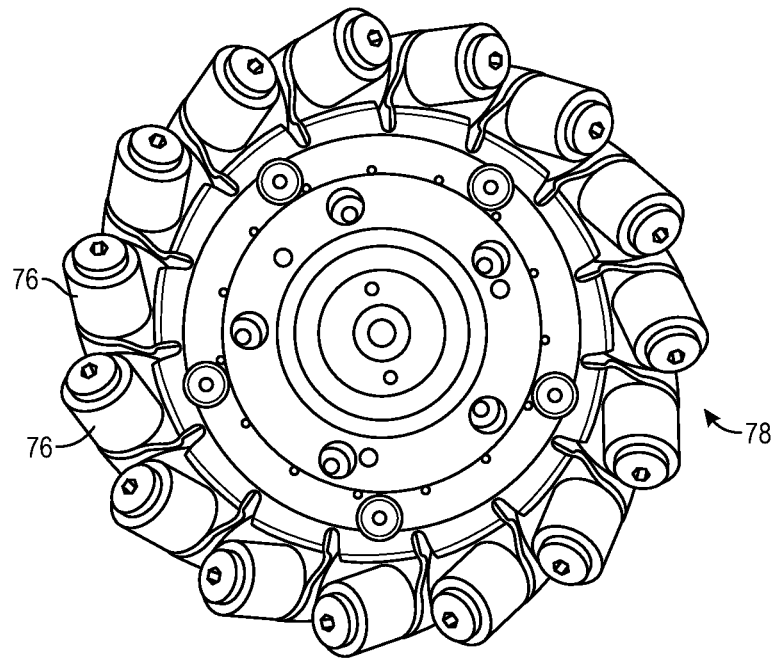
FIG. 4A depicts a front view of a multi-layer mecanum wheel.

FIG. 4A depicts a side view of a multi-layer mecanum wheel 78 comprising a plurality of layers of rollers 76. In some embodiments, some of the mecanum wheels 58 may be the multi-layer mecanum wheel 78. The multi-layer mecanum wheel 78 may have a greater contact surface area than a single-layer mecanum wheel, such as shown in FIGS. 3A and 3B. The greater contact surface area may aid in distributing a gripping force to grasp the pole 8. The multi-layer mecanum wheel 78 may be a left hand type multi-layer mecanum wheel or a right hand type multi-layer mecanum wheel. The rollers 76 on the multi-layer mecanum wheel 78 may be oriented at a 45 degree angle from the axis of rotation for the left hand type mecanum wheel and may be oriented at a negative 45 degree angle from the axis of rotation for the right hand type mecanum wheel.

In some embodiments, the multi-layer mecanum wheel 78 may be used to increase the overall contact surface area between the mecanum wheels 58 and the pole 8 or to achieve a similar contact surface area using a fewer number of mecanum wheels 58 relative to embodiments where single-layer mecanum wheels are used. Some embodiments of the invention may use any number of multi-layer mecanum wheels 78 or single-layer mecanum wheels, as well as any combination of multi-layer mecanum wheels 78 and single-layer mecanum wheels.

Figure 4B:
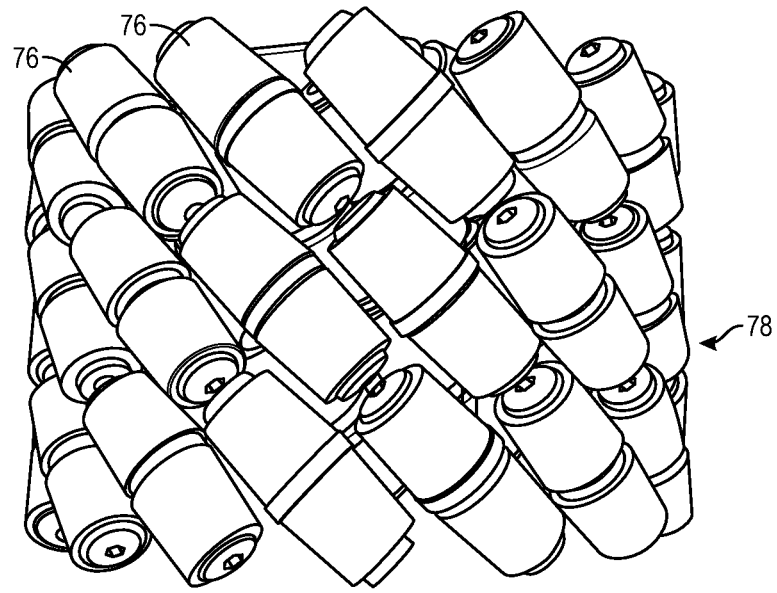
FIG. 4B is a side view of a multi-layer mecanum wheel.

FIG. 4B depicts a front view of the multi-layer mecanum wheel 78. The plurality of rollers 76 may include multiple layers of rollers 76. For instance, the multi-layer mecanum wheel 78 depicted in FIG. 4B comprises three layers of rollers 76. Some embodiments may include more or fewer layers of rollers 76, such as two, four or five layers. As described above, in some embodiments, it may be desirable to use multi-layer mecanum wheels 78 to increase the contact surface area between the mecanum wheels 58 and the pole 8. Accordingly, some embodiments may use multi-layer mecanum wheels 78 and only include a single upper grapple 30 as the contact surface area provided by the multi-layer mecanum wheels 78 may be sufficient to support the pole 8 without requiring a lower grapple 44.

Figure 5:
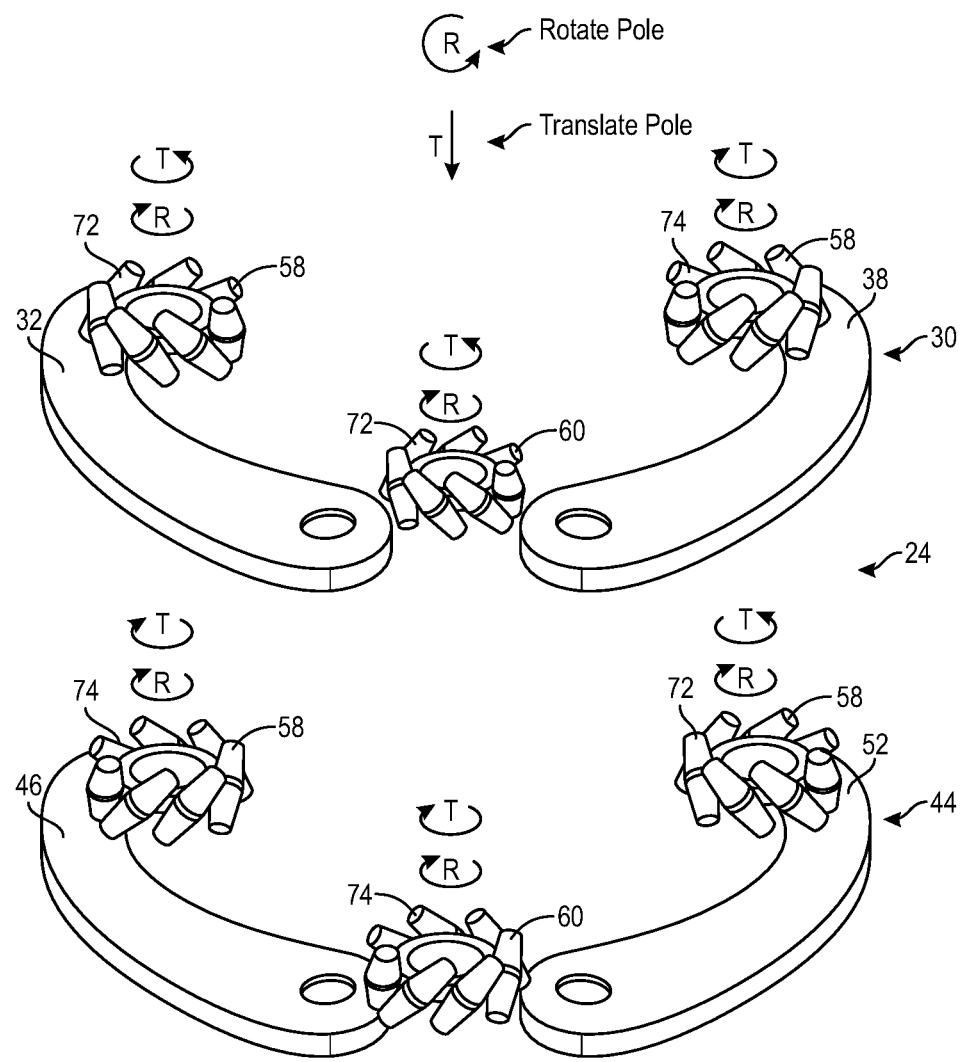
FIG. 5 depicts an embodiment of a grapple assembly including right hand type mecanum wheels and left hand type mecanum wheels.

FIG. 5 depicts an exploded view of the grapple assembly 24. The grapple assembly 24 comprises the upper grapple 30 and the lower grapple 44. The upper grapple 30 comprises the first upper grapple arm 32 and the second upper grapple arm 38. The lower grapple 44 comprises the first lower grapple arm 46 and the second lower grapple arm 52. At least one mecanum wheel 58 may be disposed at the grapple arm tip 36 of each grapple arm 32, 38, 46, 52. In some embodiments, the left hand type mecanum wheel 72 disposed between the first upper grapple arm 32 and the second upper grapple arm 38 and the right hand type mecanum wheel 74 disposed between the first lower grapple arm 46 and second lower grapple arm 52 may be replaced with idler wheels 60 as shown in FIG. 2A. The idler wheels 60 may be operable to rotate freely and not be driven by drive motors 68.

Each of the mecanum wheels 58 may be a left hand type mecanum wheel 72 or a right hand type mecanum wheel 74. In some embodiments, it may be desirable to stagger the left hand type mecanum wheels 72 and the right hand type mecanum wheels 74. For example, as shown in FIG. 5, the mecanum wheel on the first upper grapple arm 32 may be a left hand type mecanum wheel 72, the mecanum wheel on the second upper grapple arm 38 may be a right hand type mecanum wheel 74, the mecanum wheel on the first lower grapple arm 46 may be a right hand type mecanum wheel 74, and the mecanum wheel on the second lower grapple arm 52 may be a left hand type mecanum wheel 72.

In FIG. 5, two arrows are depicted with a rotation arrow denoted by an "R" indicating a rotation of the respective mecanum wheel to produce rotation of the pole 8 in a primary pole rotation direction, and a translation arrow denoted by a "T" indicating a rotation of the respective mecanum wheel to produce translation of the pole 8 in a primary pole translation direction. It should be understood that the mecanum wheels 58 can be rotated in the opposite direction (e.g., opposite the direction of the arrow shown) to produce either a reverse rotation of the pole 8 or a reverse translation of the pole 8 opposite the primary pole rotation direction and primary pole translation direction, respectively.

Embodiments depicted in FIG. 5 will now be described in operation. During operation, the upper grapple 30 and lower grapple 44 may be positioned around a pole 8 so that the mecanum wheels 58 are in contact with an outer surface of the pole 8. If it is desired to translate the pole 8 in the primary pole translation direction, each of the mecanum wheels 58 may be driven by a respective drive motor 68 to rotate the mecanum wheels 58 in the direction indicated by the respective translation arrow. If it is desired to rotate the pole 8 in the primary rotation direction, each of the mecanum wheels 58 may be driven by the respective drive motor 68 to rotate the mecanum wheels 58 in the direction indicated by the respective rotation arrow.

In some embodiments, based on the orientation of the mecanum wheels 58, the control of the mecanum wheels 58 (direction of rotation) to perform various operations may vary. For example, if the mecanum wheels 58 are positioned in different locations or the type of mecanum wheels 58 (e.g., left hand or right hand) is changed, the mecanum wheels 58 may need to be driven in a different direction to perform the indicated operation.

It should be understood that other operations besides rotation and translation may be made possible by the invention, for example, rotation and translation could be achieved simultaneously by adjusting the rotational speeds of the mecanum wheels 58. Another function of the pair of grapples 30, 44 may be a draw in function. The draw in function may be performed by rotating the mecanum wheels 58 on the grapple arm tips 36 inwards to draw in the pole 8. The draw in function may be performed before the upper grapple 30 and lower grapple 44 are positioned around the pole 8 and may aid in positioning and centering the pole 8.

FIG. 6 depicts the grapple assembly 24, which may comprise at least one of the upper grapple 30 or the lower grapple 44 as described above but will be described herein as the upper grapple 30. The upper grapple 30 comprises the first upper grapple arm 32 and the second upper grapple arm 38. The first upper grapple arm 32 may be pivotably attached to a first linkage 80 at the grapple arm base 34 of the first upper grapple arm 32. The first upper grapple arm 32 may also be pivotably attached to a first link component 82 at the grapple arm base 34 of the first upper grapple arm 32. The second upper grapple arm 38 may be pivotably attached to a second linkage 84 at the grapple arm base 34 of the second upper grapple arm 38. The second upper grapple arm 38 may also be attached to a second link component 86 at the grapple arm base 34 of the second upper grapple arm 38. A hydraulic cylinder 90 may be disposed adjacent to the grapple base 28. In some embodiments, the hydraulic cylinder 90 may be pivotably attached to the second link component 86 and a third linkage 88. The third linkage 88 may be pivotably attached to the first linkage 80 and the second linkage 84. The hydraulic cylinder 90 may be operable to expand and retract the first upper grapple arm 32 and second upper grapple arm 38 to open and close the upper grapple 30 respectively.

In some embodiments, four mecanum wheels 58 may be used to aid in the control of the pole 8. The mecanum wheels 58 may be positioned on each of the first upper grapple arm 32 and second upper grapple arm 38 such that when the upper grapple 30 is holding the pole 8, each of the mecanum wheels 58 is positioned equidistant around the circumference of the pole 8, with about 90 degrees of spacing between each of the mecanum wheels 58. Each of the mecanum wheels 58 may be either the left hand type mecanum wheel 72 or the right hand type mecanum wheel 74. In some embodiments, the mecanum wheels 58 may be spaced equidistant from one another across the length of the grapple arm.

During operation of the grapple assembly 24 shown in FIG. 6, the upper grapple 30 may be placed around the pole 8, so that each of the four mecanum wheels 58 contacts the pole 8. The mecanum wheels 58 may be driven by drive motor 68 to rotate the mecanum wheels 58 to produce translation and/or rotation of the pole 8. In some embodiments, having four mecanum wheels 58 may be desirable to aid in controlling motion of the pole 8 and properly supporting the pole 8. Depending on the orientation of each of the mecanum wheels 58 and the desired operation, each of the mecanum wheels 58 may be driven in one of a first direction and a second direction opposite the first direction. For example, the first direction may be counter-clockwise rotation of the mecanum wheels 58 and the second direction may be clockwise rotation of the mecanum wheels 58. In some embodiments, the first direction of a first mecanum wheel 58 may be different from the first direction of a second mecanum wheel 58. Further, in some embodiments, the rotation direction of each of the mecanum wheels 58 may be based on the type of mecanum wheel (e.g., left hand type or right hand type).

In some embodiments, it may be desirable to alter the shape of the first upper grapple arm 32. The first upper grapple arm 32, as shown, may be a curved member to curve around a cylindrical surface of the pole 8. In some embodiments, the first upper grapple arm 32 may be tapered so that the grapple arm base 34 has a larger cross section than the grapple arm tip 36 for supporting the grapple arm 32. However, some embodiments may include a first upper grapple arm 32 with a different geometry, such as, for example, L-shaped, cylindrical, rectangular, or any other geometry suitable to support the mecanum wheels 58 and fit around the pole 8. Further, in some embodiments, the first upper grapple arm 32 may be extendable and retractable. By extending/retracting the first upper grapple arm 32, the first upper grapple arm 32 may be enabled to grasp various pole sizes of pole 8. Additionally, the first upper grapple arm 32 may be sized and shaped according to a pole size and pole shape of pole 8. In some embodiments, the first upper grapple arm 32 may be removable from the grapple assembly 24, so that the first upper grapple arm 32 can be replaced. It may be desirable to replace the grapple arm 32 if the first upper grapple arm 32 has become damaged or if a first upper grapple arm 32 with a different size or shape is to be used for a specific application. In other embodiments, the first upper grapple arm 32 may be permanently secured to the grapple assembly 24. Additionally, the first upper grapple arm 32 may comprise multiple sections, wherein at least one section is removable. Each of the second upper grapple arm 38, the first lower grapple arm 46, and the second lower grapple arm 52 may be designed similarly to the first upper grapple arm 32 as discussed above.

In some embodiments, it may be desirable to increase the gripping force of the upper grapple 30 and lower grapple 44. Because the mecanum wheels 58 may be the only point of contact with pole 8 in some embodiments, the area of contact may be reduced relative to typical grapple devices. Accordingly, an increased gripping force may allow the mecanum wheels 58 to effectively support the pole 8. In some embodiments, the increased gripping force may be applied to at least one of the first upper grapple arm 32, the second upper grapple arm 38, the first lower grapple arm 46, and the second lower grapple arm 52 by the hydraulic cylinder 90.

FIG. 7 shows a hydraulic circuit 92 that may be used in some embodiments. The hydraulic circuit 92 may include a hydraulic power source 94, which in some embodiments, may comprise a motor 96, and a hydraulic pump 98, wherein the motor 96 may be an electric motor configured to drive the hydraulic pump 98. The hydraulic pump 98 may pump a hydraulic fluid through the hydraulic circuit 92 by supplying the hydraulic fluid at a certain pressure. The hydraulic circuit 92 may include any number of pressure sensors 100 which may be pressure gauges for reading the pressure of the hydraulic fluid. The pressure sensors 100 may be disposed at any point along the hydraulic circuit 92. Additionally, the hydraulic circuit 92 may include at least one pressure relief valve 102 to reduce the pressure of the hydraulic fluid if the pressure of the hydraulic fluid exceeds a pressure threshold.

In some embodiments, the hydraulic circuit 92 may further comprise a directional control valve 104 for controlling the flow direction of the hydraulic fluid in the hydraulic circuit 92. In some embodiments, the directional control valve 104 may comprise a spool (not shown) and a plurality of ports (not shown). The spool may be moved throughout a range of positions to either restrict or permit the flow of the hydraulic fluid. The spool may be actuated by any actuating method, such as, for example, manual actuation, spring actuation, electrical actuation, pneumatic actuation, and hydraulic actuation. The plurality of ports may comprise a first port and a second port, wherein each of the first port and the second port is operable to either carry hydraulic fluid from the directional control valve 104 to the hydraulic motor 112 or carry hydraulic fluid from the hydraulic motor 112 to the directional control valve 104. In some embodiments, operation of the directional control valve 104 may be determined by an input 120. The input 120 may be a signal to the directional control valve 104. In some embodiments, the input 120 may be one of a controller input from a controller or an operator input from an operator. In some embodiments, the signal may be any type of signal such as, for example, a hydraulic signal, or an electrical signal. In some embodiments, the signal may be based on operator input. The signal may be used to adjust the directional control valve 104.

The hydraulic motor 112 of the hydraulic circuit 92 may be the drive motor 68 in some embodiments. Accordingly, the hydraulic motor 112 may be used to drive at least one of the mecanum wheels 58. The hydraulic motor 112 may be coupled to input shaft 70, so that rotation of the hydraulic motor 112, the input shaft 70, and at least one of the mecanum wheels 58 is coupled.

The hydraulic circuit 92 may further comprise a reservoir 114 for storing the hydraulic fluid. The reservoir 114 may supply hydraulic fluid to the hydraulic pump 98. In some embodiments, the hydraulic fluid may pass through a filter 116 before entering the hydraulic pump 98. The filter 116 may be used to filter contaminants from the hydraulic fluid.

The hydraulic circuit 92 of FIG. 7 will now be described in operation. During operation of the hydraulic circuit 92, the electric motor may be activated to drive the hydraulic pump 98. The hydraulic pump 98 draws hydraulic fluid from the reservoir 114 through the filter 116 and pumps the hydraulic fluid through the hydraulic circuit 92. The pressure relief valve 102 may be used to bleed off pressure from the hydraulic circuit 92 if the pressure of the hydraulic fluid exceeds the pressure threshold as determined by pressure sensors 100. The hydraulic pump 98 supplies the pressurized hydraulic fluid to the directional control valve 104 which may allow the hydraulic fluid to flow through a first port to the hydraulic motor 112 to drive the hydraulic motor 112 in a first rotation direction. After flowing through the hydraulic motor 112 the hydraulic fluid may return through the second port of the directional control valve 104 and flow back into the reservoir 114.

Alternatively, to drive the hydraulic motor 112 in a second rotation direction opposite the first rotation direction the directional control valve 104 may be adjusted so that the hydraulic fluid flows from the hydraulic pump 98 through the second port into the hydraulic motor 112. Adjustment of the directional control valve 104 may be based on a signal received by the directional control valve 104 from the input 120. Thus, by reversing the flow of hydraulic fluid through the hydraulic motor 112 the direction of rotation of the hydraulic motor 112 may be reversed. In some embodiments, the directional control valve 104 may be adjusted by actuating the spool to move the spool to a different position.

As discussed above, the hydraulic motor 112 may be the drive motor 68 used to drive one of the mecanum wheels 58. It should be appreciated that the hydraulic circuit 92 may include any number of hydraulic motors 112 for driving any number of mecanum wheels 58. Alternatively, some embodiments have a plurality of hydraulic circuits 92, wherein each hydraulic circuit 92 may be configured to drive a respective hydraulic motor 112. In addition, some embodiments may include a hydraulic circuit 92 for each function of the mecanum wheels 58, such as, for example, a first hydraulic circuit 92 designated to translate the pole 8, a second hydraulic circuit 92 designated to rotate the pole 8, and a third hydraulic circuit 92 designated to draw in the pole 8.

In some embodiments, the hydraulic circuit 92 or a portion of the hydraulic circuit 92 may be included on the grapple assembly 24. For example, the hydraulic motor 112 and the input 120 may be comprised by the grapple assembly 24.

Figure 8:
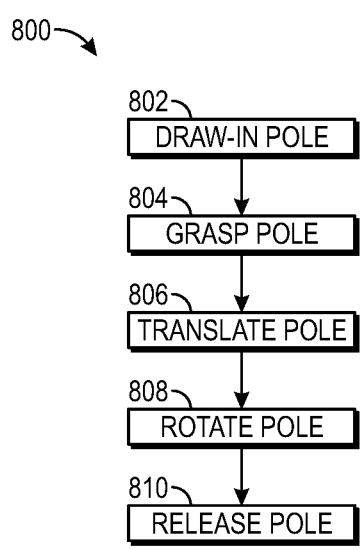
FIG. 8 depicts an exemplary diagram of a grappling process for some embodiments.

FIG. 8 shows a diagram depicting an exemplary grapple process 800 for positioning the pole 8 in some embodiments. At step 802 the grapple assembly 24 may be positioned adjacent to the pole 8, so that the mecanum wheels 58 at the grapple arm tip 36 contact the pole 8. The mecanum wheels 58 may be driven inwards to draw in the pole 8 into the upper grapple 30 using the drive motor 68. At step 804 the upper grapple 30 may be closed to grasp the pole 8. Here, the upper grapple 30 may be closed by actuating the hydraulic cylinder 90 to retract the first upper grapple arm 32 and the second upper grapple arm 38. The upper grapple 30 may apply a force through the mecanum wheels 58 to the pole 8 to hold the pole 8 in place.

Next, at step 806, the pole 8 may be translated by driving the mecanum wheels 58. The mecanum wheels 58 may be driven by the drive motor 68. In some embodiments, the driving of the mecanum wheels 58 described herein may refer to the rotation of the mecanum wheels 58. The rotation of the mecanum wheels 58 may be about an axis of the input shaft 70. In some embodiments, drive motor 68 may be one of a plurality of drive motors that may be operable to drive each of the mecanum wheels 58 independently. Translation of the pole 8 may be vertical (e.g., upwards or downwards) along the length of the pole 8. In some embodiments, the pole 8 may be translated downwards into a hole in the ground to set the pole 8.

At step 808, the pole 8 may be rotated by driving the mecanum wheels 58 using drive motor 68. It should be understood that the control of the mecanum wheels 58 to perform the draw in, translation, and rotation operations may be altered according to the orientation and position of each of the mecanum wheels 58. As such, for each operation the mecanum wheels 58 may be driven in the same direction, or opposite directions. In some embodiments, the pole 8 may be rotated to position at least one component of the pole 8 in a specific orientation. For example, if the pole 8 is a utility pole, the utility pole may be rotated so that a crossbar, and a plurality of insulators of the utility pole are in a specific position.

At step 810, the pole 8 may be released from the grapple assembly 24 by opening the upper grapple 30 by extending the first upper grapple arm 32 and the second upper grapple arm 38. In some embodiments, the pole 8 may be released in a hole so that the pole 8 stands vertically from the ground. Thus, the steps above provide a method for positioning the pole 8 using the grapple assembly 24 for some embodiments. Although the process is described with respect to upper grapple 30, the process can further include similar steps for using the lower grapple 44, which can be operated simultaneously or sequentially with that of the upper grapple 30. In some embodiments, the upper grapple 30 may support an upper section of the pole 8 while the lower grapple 44 may support a lower section of the pole 8. By grasping the pole 8 with both the upper grapple 30 and the lower grapple 44 the pole 8 may be restricted from unintentional rotation. Additionally, using both the upper grapple 30 and lower grapple 44 to grasp the pole 8 may offer increased support of the pole 8 to improve safety.

In some embodiments, the steps described above may be carried out using a controller programmed to control the drive motor 68 or an operator of the grapple assembly 24. In some embodiments, the input 120 may be an operator input for a desired operation of the drive motor 68 and hydraulic cylinder 90. The input 120 may be operable to adjust the directional control valve 104. In some embodiments, the input 120 is used to adjust the directional control valve 104 to control the rotation of the drive motor 68. Thus, control of the directional control valve 104 may be based on the input 120.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

The invention claimed is:

1. A grapple assembly for grasping and positioning a pole, the grapple assembly comprising:
    a grapple base;
    a plurality of grapple arms pivotably attached to the grapple base configured to grasp the pole therebetween;
    a plurality of mecanum wheels, wherein the plurality of mecanum wheels are disposed on the plurality of grapple arms or on the grapple base,
    wherein at least a portion of the plurality of mecanum wheels contact the pole to support the pole during operation,
    wherein an axis of rotation of the plurality of mecanum wheels is normal to a top surface of the plurality of grapple arms; and
    a plurality of drive motors, wherein each drive motor is coupled to one of the plurality of mecanum wheels,
    wherein each drive motor is configured to drive the respective mecanum wheel to translate and rotate the pole.

2. The grapple assembly of claim 1,
    wherein the plurality of mecanum wheels comprises a first mecanum wheel disposed on a first grapple arm of the plurality of grapple arms, and a second mecanum wheel disposed on a second grapple arm of the plurality of grapple arms,
    wherein the plurality of drive motors comprises a first drive motor for driving the first mecanum wheel and a second drive motor for driving the second mecanum wheel, and
    wherein the first mecanum wheel is a left hand type mecanum wheel and the second mecanum wheel is a right hand type mecanum wheel.

3. The grapple assembly of claim 2, wherein the first drive motor is configured to drive the first mecanum wheel in a first direction and the second drive motor is configured to drive the second mecanum wheel in the first direction to rotate the pole.

4. The grapple assembly of claim 3, wherein the first drive motor is configured to drive the first mecanum wheel in the first direction and the second drive motor is configured to drive the second mecanum wheel in a second direction opposite the first direction to translate the pole.

5. The grapple assembly of claim 1, further comprising at least one idler omni-wheel for supporting the pole.

6. The grapple assembly of claim 1, wherein at least one of the plurality of mecanum wheels is a multi-layer mecanum wheel.

7. The grapple assembly of claim 1, wherein each of the plurality of grapple arms comprises a set of mecanum wheels from the plurality of mecanum wheels, and each wheel of the set of mecanum wheels are spaced equidistant across the length of each grapple arm.

8. The grapple assembly of claim 1, wherein the plurality of grapple arms comprises a first upper grapple arm, a second upper grapple arm, a first lower grapple arm, and a second lower grapple arm.

9. The grapple assembly of claim 8, wherein the plurality of mecanum wheels comprises:
    a first upper mecanum wheel disposed on the first upper grapple arm;
    a second upper mecanum wheel disposed on the second upper grapple arm;
    a first lower mecanum wheel disposed on the first lower grapple arm; and
    a second lower mecanum wheel disposed on the second lower grapple arm.

10. The grapple assembly of claim 9, wherein the plurality of drive motors comprises:
    a first upper drive motor coupled to the first upper mecanum wheel for driving the first upper mecanum wheel;
    a second upper drive motor coupled to the second upper mecanum wheel for driving the second upper mecanum wheel;
    a first lower drive motor coupled to the first lower mecanum wheel for driving the first lower mecanum wheel; and
    a second lower drive motor coupled to the second lower mecanum wheel for driving the second lower mecanum wheel.

11. The grapple assembly of claim 10, wherein the first upper mecanum wheel, the second upper mecanum wheel, the first lower mecanum wheel, and the second lower mecanum wheel are rotated to draw the pole into the plurality of grapple arms.

12. The grapple assembly of claim 8, wherein the plurality of mecanum wheels comprises:
    a first upper mecanum wheel disposed on the grapple base adjacent the first upper grapple arm and the second upper grapple arm;
    a second lower mecanum wheel disposed on the grapple base adjacent the first lower grapple arm and the second lower grapple arm.

13. A method for using a grapple assembly to position a pole, the method comprising the steps of:
    providing a grapple assembly comprising:
        a grapple base;
        a plurality of grapple arms pivotably attached to the grapple base;
        a plurality of mecanum wheels, wherein the plurality of mecanum wheels is disposed on the plurality of grapple arms or on the grapple base;
        a plurality of drive motors, wherein each drive motor is coupled to one of the plurality of mecanum wheels;
    moving at least one grapple arm of the plurality of grapple arms to grasp the pole between the plurality of grapple arms;
    applying a force through the plurality of mecanum wheels to support the pole;
    driving at least one of the plurality of drive motors to rotate at least one of the plurality of mecanum wheels to rotate the pole;
    driving at least one of the plurality of drive motors to rotate at least one of the plurality of mecanum wheels to translate the pole, wherein an axis of rotation of the plurality of mecanum wheels is normal to a top surface of the plurality of grapple arms; and moving at least one grapple arm of the plurality of grapple arms to release the pole.

14. The method of claim 13, wherein at least one of the plurality of mecanum wheels is a left hand type mecanum wheel, and at least one of the plurality of mecanum wheels is a right hand type mecanum wheel, the method further comprising:

driving the left hand type mecanum wheels in a first direction and driving the right hand type mecanum wheels in a second direction opposite the first direction to translate the pole.

15. The method of claim 14, further comprising:

driving the left hand type mecanum wheels in the first direction and driving the right hand type mecanum wheels in the first direction to rotate the pole.

16. The method of claim 13, further comprising the step of driving at least one of the plurality of drive motors to rotate at least one of the plurality of mecanum wheels inwards to draw the pole into the plurality of grapple arms such that the pole is positioned within the plurality of grapple arms.

17. A system for setting a pole, the system comprising:

a grapple assembly adapted to be secured to a distal end of a boom, the grapple assembly comprising:

a grapple base; and an upper grapple configured to grasp the pole therebetween comprising:

a first upper grapple arm pivotably attached to the grapple base;

a first upper mecanum wheel disposed on the first upper grapple arm, wherein the first upper mecanum wheel is oriented such that an axis of rotation of the first upper mecanum wheel is normal to a top surface of the first upper grapple arm;

a first upper drive motor coupled to the first upper mecanum wheel;

a second upper grapple arm pivotably attached to the grapple base;

a second upper mecanum wheel disposed on the second upper grapple arm, wherein the second upper mecanum wheel is oriented such that an axis of rotation of the second upper mecanum wheel is normal to a top surface of the second upper grapple arm; and a second upper drive motor coupled to the second upper mecanum wheel, wherein each of the first upper drive motor and the second upper drive motor are configured to drive the first upper mecanum wheel and the second upper mecanum wheel respectively to translate and rotate the pole, wherein at least one of the first upper mecanum wheel and the second upper mecanum wheel contact the pole to support the pole during operation.

18. The system of claim 17, wherein the grapple assembly further comprises a lower grapple configured to grasp the pole therebetween comprising:

a first lower grapple arm pivotably attached to the grapple base;

a first lower mecanum wheel disposed on the first lower grapple arm;

a first lower drive motor coupled to the first lower mecanum wheel;

a second lower grapple arm pivotably attached to the grapple base;

a second lower mecanum wheel disposed on the second lower grapple arm; and a second lower drive motor coupled to the second lower mecanum wheel, wherein each of the first lower drive motor and the second lower drive motor are configured to drive the first lower mecanum wheel and the second lower mecanum wheel respectively to translate and rotate the pole.

19. The system of claim 18, wherein each of the first upper grapple arm, the second upper grapple arm, the first lower grapple arm, and the second lower grapple arm is a curved tapered member.

20. The system of claim 17, wherein the grapple assembly further comprises a wrist joint attached to the grapple base, wherein the wrist joint is operable to rotate along a first axis and along a second axis.

* * * * *